United States Patent
Dine et al.

(10) Patent No.: US 8,734,045 B1
(45) Date of Patent: May 27, 2014

(54) INNER RACE AND BOOT SLEEVE

(71) Applicant: Dana Automotive Systems Group, LLC, Maumee, OH (US)

(72) Inventors: Donald W. Dine, Whitehouse, OH (US); Dee E. Bear, Columbia City, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/678,792

(22) Filed: Nov. 16, 2012

(51) Int. Cl.
 *F16D 1/116* (2006.01)
 *F16D 3/22* (2006.01)

(52) U.S. Cl.
 USPC .................. 403/358; 403/359.5; 464/906

(58) Field of Classification Search
 USPC ........... 464/182, 906; 411/517, 518; 403/319, 403/355, 356, 358, 359.5, DIG. 7
 See application file for complete search history.

(56) References Cited

U.S. PATENT DOCUMENTS

| | | | |
|---|---|---|---|
| 2,089,168 A | | 8/1937 | Brown |
| 3,326,580 A | * | 6/1967 | Munier et al. ............ 411/517 X |
| 3,822,953 A | * | 7/1974 | Adelizzi ....................... 403/356 |
| 3,992,117 A | * | 11/1976 | Ristau ..................... 403/359.5 X |
| 4,124,318 A | * | 11/1978 | Sagady .................. 403/359.5 X |
| 5,643,092 A | | 7/1997 | Girguis |
| 5,665,001 A | | 9/1997 | Jacob et al. |
| 5,807,180 A | | 9/1998 | Knodle |
| 5,823,883 A | | 10/1998 | Hopson |
| 6,132,316 A | | 10/2000 | Statham |
| 6,158,916 A | | 12/2000 | Wormsbaecher |
| 6,264,568 B1 | | 7/2001 | Frazer et al. |
| 6,280,337 B1 | | 8/2001 | Wormsbacher |
| 6,390,925 B1 | | 5/2002 | Perrow |
| 7,008,325 B2 | | 3/2006 | Bongartz et al. |
| 7,094,155 B2 | | 8/2006 | Hosoya et al. |
| 7,677,984 B2 | | 3/2010 | Hahn et al. |
| 7,896,749 B2 | | 3/2011 | Booker |
| 8,012,030 B2 | | 9/2011 | Cermak et al. |
| 8,025,454 B2 | | 9/2011 | Cermak |
| 2006/0019757 A1 | | 1/2006 | Brunetti et al. |
| 2006/0217208 A1 | | 9/2006 | Worman |
| 2007/0173337 A1 | | 7/2007 | Wormsbaecher et al. |
| 2010/0254754 A1 | | 10/2010 | Berube |
| 2012/0010008 A1 | | 1/2012 | Szentmihalyi |
| 2012/0015750 A1 | | 1/2012 | Dine et al. |

FOREIGN PATENT DOCUMENTS

| | | |
|---|---|---|
| CH | 266957 | 2/1950 |
| DE | 345306 | 12/1921 |
| DE | 102004048079 A1 | 4/2006 |
| GB | 2184201 A | 6/1987 |
| WO | 2010139441 A1 | 12/2010 |

* cited by examiner

*Primary Examiner* — Gregory Binda
(74) *Attorney, Agent, or Firm* — Marshall & Melhorn, LLC (57) ABSTRACT

An inner race and boot sleeve combination is provided. The inner race has an inner surface with a groove formed therein. The boot sleeve has a groove in an outer surface. A ring is located in both grooves to axially secure the inner race and boot sleeve together. Devices to prevent relatively rotation between the inner race and the boot sleeve are also provided.

10 Claims, 6 Drawing Sheets

INNER RACE AND BOOT SLEEVE

FIELD OF THE INVENTION

An inner race and boot sleeve for a constant velocity joint.

BACKGROUND

Constant velocity joints comprise an inner race that is connected to a pinion shaft. Methods and structures to connect the inner race to the pinion shaft vary. The connection must prevent, or reduce, relative axial movement and it must prevent, or reduce, relative rotational movement. The prior art designs to connect the inner race and pinion shaft are complex, expensive and/or fail to adequately reduce, or prevent, relative axial and/or rotational movement. A simple, inexpensive inner race and pinion connection is needed.

SUMMARY

In one embodiment, an inner race is provided having an inner surface with an elliptical cross section and an elliptical groove formed in said surface. A boot sleeve is provided having an outer surface, a first end portion and a second threaded end portion. The first end portion has an elliptical cross section complimentary to the inner race elliptical cross section. The first end portion also has a circumferential groove. A ring is located in the inner race groove and the boot sleeve groove to axially fix the inner race and the boot sleeve together.

In another embodiment, an inner race has an inner surface with a round circumference and a keyway partially extending into the circumference. A boot sleeve has an outer surface, a first end portion with a circumferential groove and a second threaded end portion. A key is located on the boot sleeve outer surface. The key has a groove therein and the key is located in the keyway. A ring is located in the inner race groove, the boot sleeve groove and the key groove.

In yet another embodiment an inner race has an inner surface with a round circumference and at least one axially extending slot in the circumference. A boot sleeve has an outer surface, a first end portion with a circumferential groove, at least one axially extending prong and a threaded second end portion. The at least one prong is located in the inner race slot. A ring is located in the inner race groove and the boot sleeve groove to axially fix the inner race and the boot sleeve together.

BRIEF DESCRIPTION OF THE DRAWINGS

The above will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
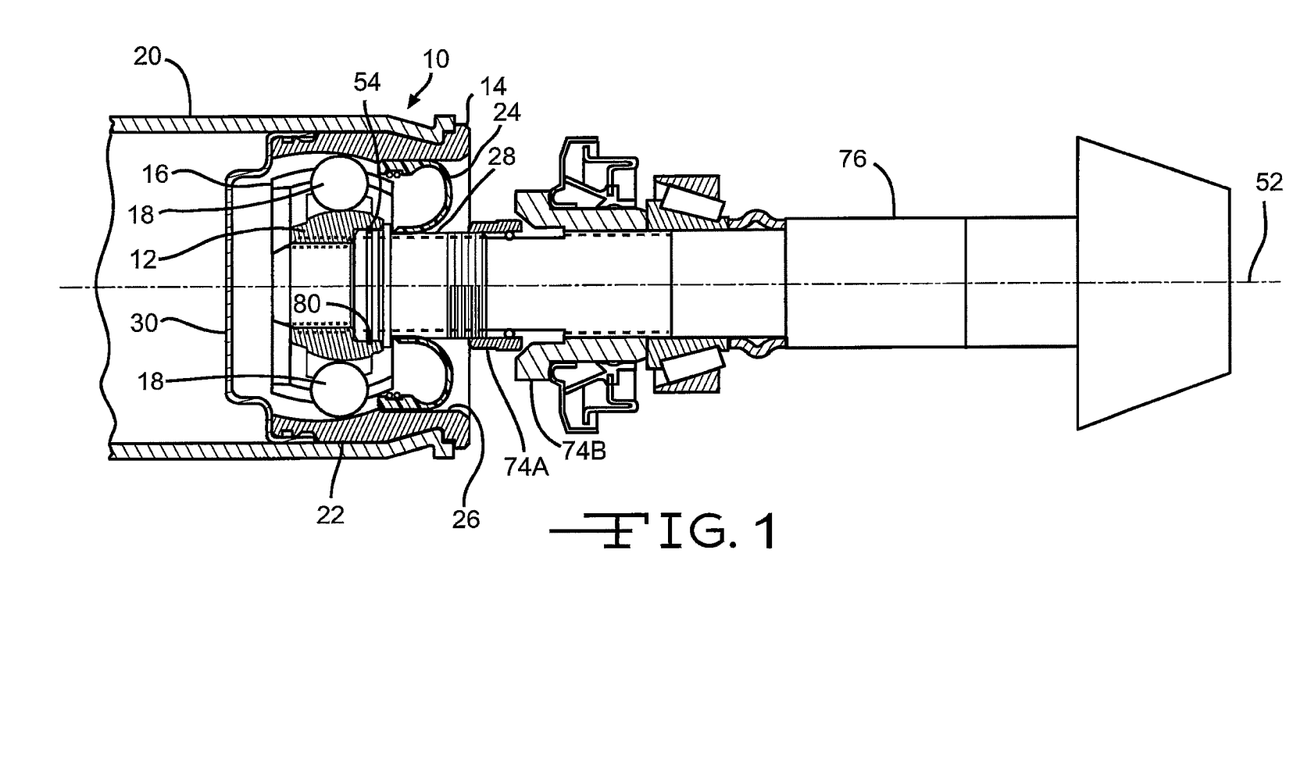
FIG. 1 is a cross-sectional assembly view of a constant velocity joint containing the features of one embodiment of the present invention.

Turning now to FIG. 1, one embodiment of a constant velocity joint 10 utilizing the present invention is depicted. The constant velocity joint 10 comprises an inner race 12, an outer race 14, a cage 16, and a plurality of balls 18. A drive shaft tube 20 is connected to an outer surface 22 of the outer race 14. A boot 24 may be located between an inner surface 26 of the outer race 14 and a boot sleeve 28 to keep debris and moisture out and lubricant in the joint 10. A can 30 may be located opposite the boot 24 for the same reasons.

Referring now to FIGS. 2 and 2A-D, one embodiment of the inner race 12 and the boot sleeve 28 are depicted. The inner race 12 has an inner surface 32, an outer surface 34, a first end portion 36 and a second end portion 38, all of which are unitary with one another.

Figure 2A:
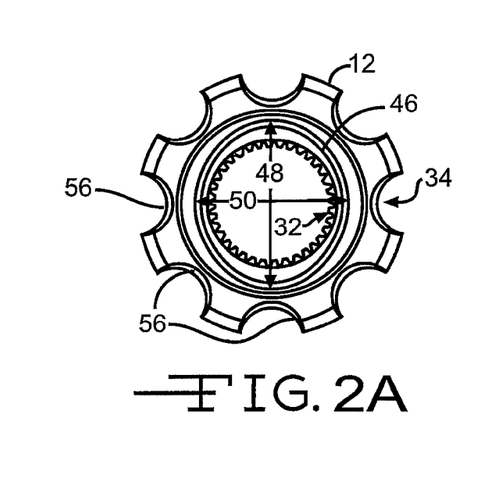
FIG. 2A is an end view of an inner race of FIG. 1.
Figure 2B:
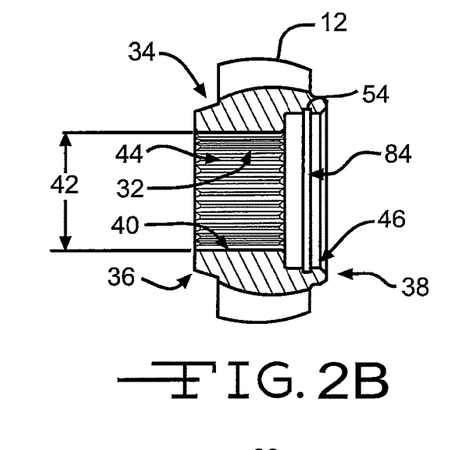
FIG. 2B is a sectional side view of the inner race of FIG. 2A.

The inner surface 32 is defined by a plurality of surfaces. Beginning from the first end portion 36, a first inner surface 40 is provided. The first inner surface 40 has a first inner surface diameter 42 and it is round in cross-section. A set of splines 44 may be located on the first inner surface 40 and extend in the axial direction. The first inner surface 40 is directly adjacent and transitions to a second inner surface 46.

The second inner surface 46 has an elliptical shape as best seen in FIG. 2A. As an ellipse, the second inner surface 46 has a major diameter 48 and minor diameter 50. The major diameter 48 is oriented transverse to a rotational axis 52 of the joint 10. The major diameter 48 is greater than the first inner surface diameter 42, and the minor diameter 50.

The second inner surface 46 has a continuous groove 54 defined therein. The groove 54 may be located approximately midway between the first inner surface 40 and the second end portion 38. The groove 54 also has a elliptical shape that follows the elliptical shape of the second inner surface 46.

The outer surface 34 of the inner race 12 is defined by a plurality of grooves 56. Each groove 56 receives one ball 18. The balls 18 are maintained in the cage 16, as shown in FIG. 1. The balls 18 are also received within grooves 56 in the inner surface 26 of the outer race 14. The balls 18 permit angular differences between the inner race 12 and outer race 14, and transmit rotational torque from the inner race 12 to the outer race 14.

Figure 2C:
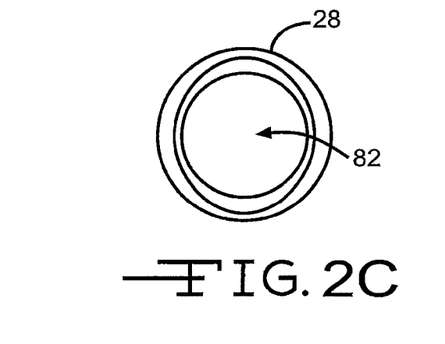
FIG. 2C is an end view of a boot sleeve of FIG. 1.
Figure 2D:
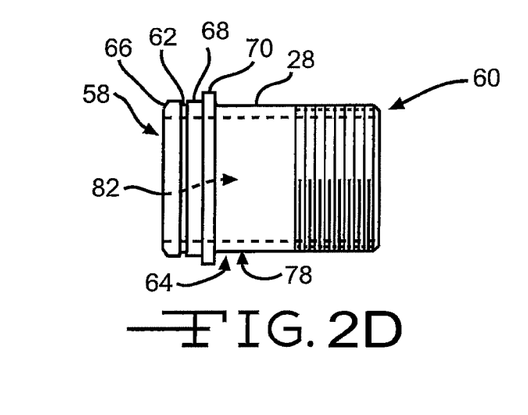
FIG. 2D is side view of the boot sleeve of FIG. 2C.

The boot sleeve 28 has first and second end portions 58, 60. The first end portion 58 comprises a continuous groove 62 on an outer surface 64. More particularly, the first end portion 58 preferably has a first land area 66, the groove 62, a second land area 68 and then a stop 70, in that order from the first end portion 58 inwardly. The portions 58, 60, the groove 62 and the stop 70 are integrally formed and unitary with the sleeve 28.

The stop 70 is preferably continuous, but it need not be. As shown in FIG. 2D, the stop 70 is angled with respect to the outer surface 64. As shown in the depicted embodiment, the stop 70 may be angled substantially transverse to the joint axis 52. A land area 78 separates the threads 72 and the stop 70.

The second end portion 60 comprises a plurality of threads 72 integrally formed and unitary with the sleeve 28. A sleeve nut 74A, as shown in FIG. 1, may be engaged with the threads 72 of the second end portion 60. The sleeve nut 74A may be secured to a pinion shaft 76. The connection maybe made such as by a circlip and/or a threaded connection; other connections are permissible.

The first end portion 58 of the boot sleeve 28 has an elliptical shape that is complimentary to the elliptical shape of the second inner surface 46 of the inner race 12. The boot sleeve 28 is shaped and dimensioned to fit within the inner race 12. More particularly, the elliptical shapes of the inner race 12 and the boot sleeve 28 are aligned with one another, the inner race 12 is located within the boot sleeve 28 and their complimentary shapes prevent them from rotating relative to one another.

A ring 80, such as a snap ring, is located in the boot sleeve groove 62 and the inner race groove 54, as shown in FIG. 1. The ring 80 is sized to simultaneously extend into both the boot sleeve groove 62 and the groove 54 of the inner race 12. The ring 80 prevents, or reduces, axial movement between the inner race 12 and the boot sleeve 28.

The pinion shaft 76 may be located within a hollow interior portion 82 of the boot sleeve 28. As shown in FIG. 1, the pinion shaft 76 extends entirely through the boot sleeve 28. The pinion shaft may extend beyond the boot sleeve 28 and into a cavity 84 of the inner race 12 where it engages the splines 44 (FIG. 2B). The pinion shaft 76 also extends through the opposite end of the boot sleeve 28. The pinion shaft 76 receives rotation from a source of rotational movement, such as a vehicle powertrain. A possible connection between the pinion shaft 76 and the boot sleeve 28 is described above so that the two rotate together.

FIGS. 3 and 3A-3E depicts another embodiment of an inner race 86 and boot sleeve 88. The inner race 86 has an inner surface 90, an outer surface 92, a first end portion 94 and a second end portion 96.

Figure 3:
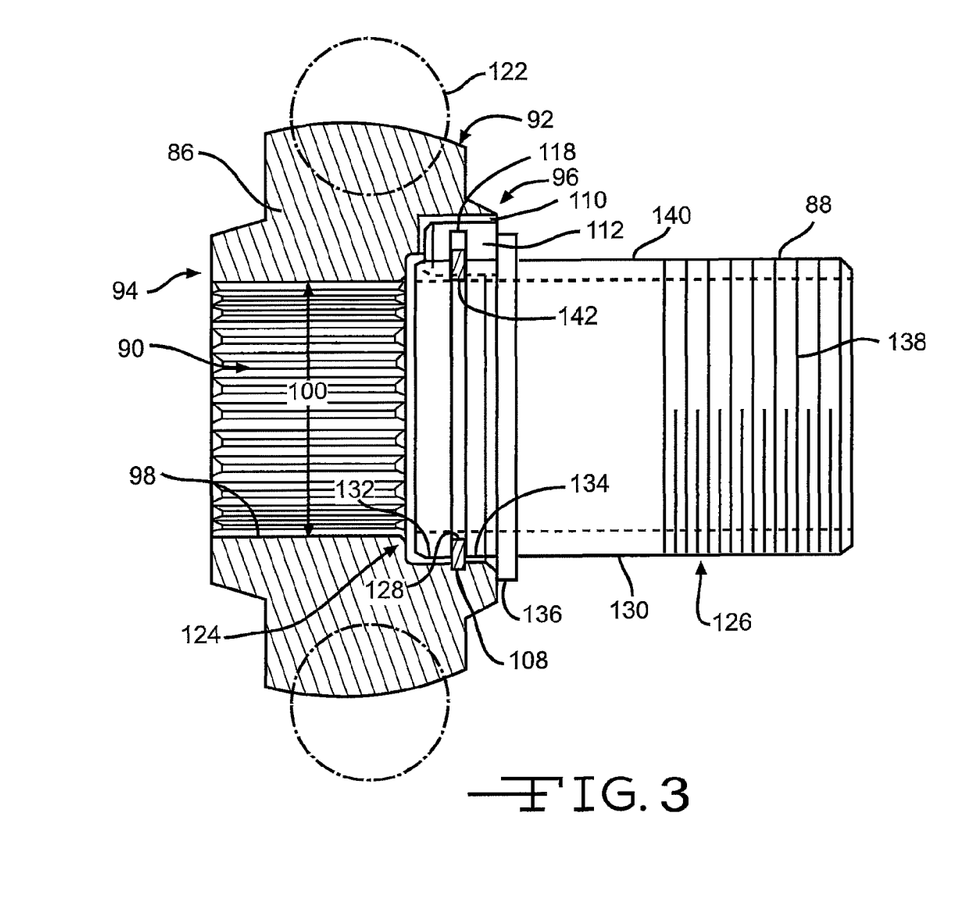
FIG. 3 is a cross-sectional assembly view of a boot sleeve and inner race according to another embodiment of the invention.

The inner surface 90 is defined by a plurality of surfaces. Beginning from the first end portion 94, a first inner surface 98 is provided. The first inner surface 98 has a first inner surface diameter 100 and is circular in cross-section. The first inner surface 98 may have a set of splines 102. The first inner surface 98 is directly adjacent and transitions to a second inner surface 104. As shown in FIGS. 3 and 3B, the first inner surface 98 is axially offset from the second inner surface 104.

Figure 3A:
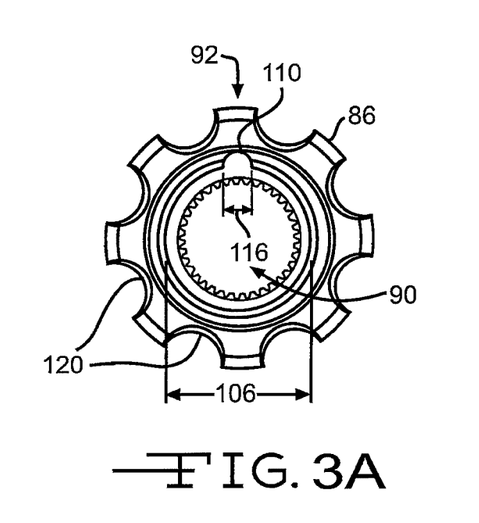
FIG. 3A is an end view of an inner race from FIG. 3.
Figure 3B:
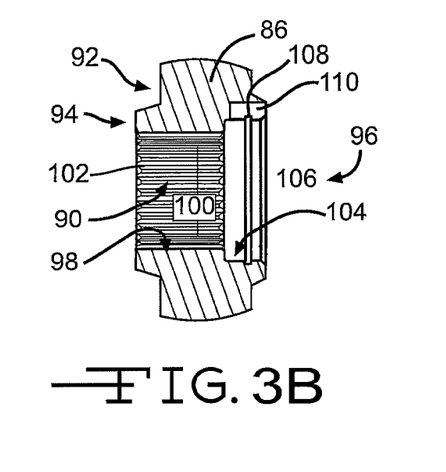
FIG. 3B is a side sectional view of the inner race of FIG. 3A.

The second inner surface 104 has a second inner surface diameter 106 and is circular, as best seen in FIG. 3A. The second inner surface diameter 106 is larger than the first inner surface diameter 100. The second inner surface 104 has a continuous, circumferential groove 108 defined therein. The groove 108 may be located approximately midway between the first inner surface 98 and the second end portion 96. The groove 108 follows the second inner surface 104 and is also therefore circular.

The second inner surface 104 also has a keyway 110. The keyway 110 extends axially approximately the length of the second inner surface 104. The keyway 110 may be of any cross-sectional shape, but as best seen in FIG. 3A, the keyway 110 preferably has a round cross-section. The keyway 110 is integrally and unitarily formed with the inner race 86. The keyway 110 is positioned such that it forms part of the second inner surface 104; the remainder of the keyway 110 is radially outward from the second inner surface 104 in the body of the inner race 86.

Figure 3C:
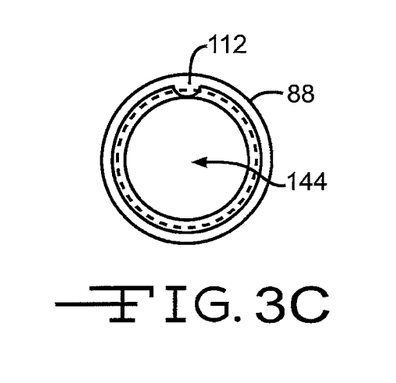
FIG. 3C is an end view of a boot sleeve from FIG. 3.
Figure 3D:
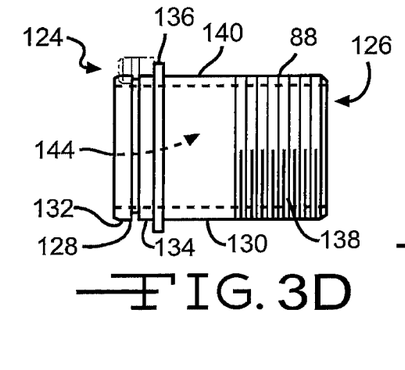
FIG. 3D is a side view of the boot sleeve of FIG. 3.
Figure 3E:
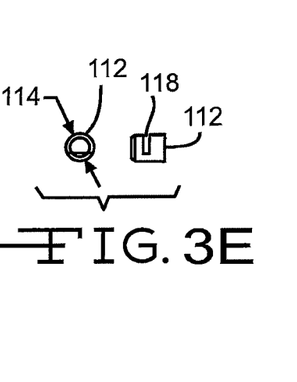
FIG. 3E is a side and end view of a key of FIG. 3.

A cylindrical key 112 is provided. The key 112 may be hollow or solid. The key 112 has a complementary outer diameter 114 that is approximately the same as an inner diameter 116 of the keyway 110, or slightly less.

The length of the key 112 is equal to or approximately the same as the length of the keyway 110. When the key 112 is located in the keyway 110, the key 112 fits entirely therein.

The key 112 has a groove 118 extending substantially perpendicularly to the joint axis 52. The key groove 118 is axially aligned with the inner race inner surface groove 108 when the key 112 is positioned on the boot sleeve 88.

The outer surface 92 of the inner race 86 is defined by a plurality of grooves. Each groove 120 receives one ball 122. The balls 122 are maintained in a cage, which is not shown but can be appreciated from FIG. 1. The balls 122 are also received within grooves in the inner surface of the outer race, which can also be appreciated from FIG. 1. The balls 122 permit angular differences between the inner race 86 and outer race, and transmit rotational torque from the inner race 86 to the outer race.

The boot sleeve 88 has first and second end portions 124, 126. The first end portion 124 comprises a continuous, circumferential groove 128 through an outer surface 130. More particularly, the first end portion 124 has a first land area 132, the groove 128, a second land area 134 and then a stop 136. The portions 124, 126, the groove 128 and the stop 136 may be integrally formed and unitary with the sleeve 88. The stop 136 may be such as stop 70 described above.

The second end portion 126 comprises a plurality of threads 138 integrally formed and unitary with the sleeve 88. As similarly depicted in FIG. 1, a nut may be engaged with the threads 138 of the second end portion 126 and also with the threads on a pinion shaft to connect the nut and the pinion shaft together. The nut may also be connected to a retaining ring. The pinion shaft is also therefore connected to the inner race 86 through the nut. A land area 140 separates the threads 138 and the stop 136.

The first end portion 124 has a round cross-section that is complimentary to the round cross-section of the second inner surface 104 of the inner race 86.

A ring 142, such as a snap ring, is located in the boot sleeve groove 128 and the inner race groove 108. The ring 142 is sized to simultaneously extend into both the boot sleeve groove 128 and the groove 108 of the inner race 86. The ring 142 prevents, or reduces, axial movement between the inner race 86 and the boot sleeve 88.

The ring 142 is installed over the key 112 to selectively secure it to the outer surface 130 of the boot sleeve 88. The ring 142, key 112 and boot sleeve 88 are located into the inner race 86 and adjacent the second inner surface 104 of the inner race 86. The key 112, fixed to the boot sleeve 88 and located within the keyway 110, prevents relative rotational movement between the boot sleeve 88 and the inner race 86.

The key 112 may be selectively secured to the boot sleeve 88, as described above, or it may be unitary and integrally formed with the boot sleeve 88.

A pinion shaft may be located within a hollow interior portion 144 of the boot sleeve 88, such as described above and depicted in FIG. 1. The pinion shaft receives rotation from a source of rotational movement, such as a vehicle powertrain.

FIGS. 4 and 4A-C depict another embodiment of an inner race 146 and boot sleeve 148. The inner race 146 has an inner surface 150, an outer surface 152, a first end portion 154 and a second end portion 156.

Figure 4:
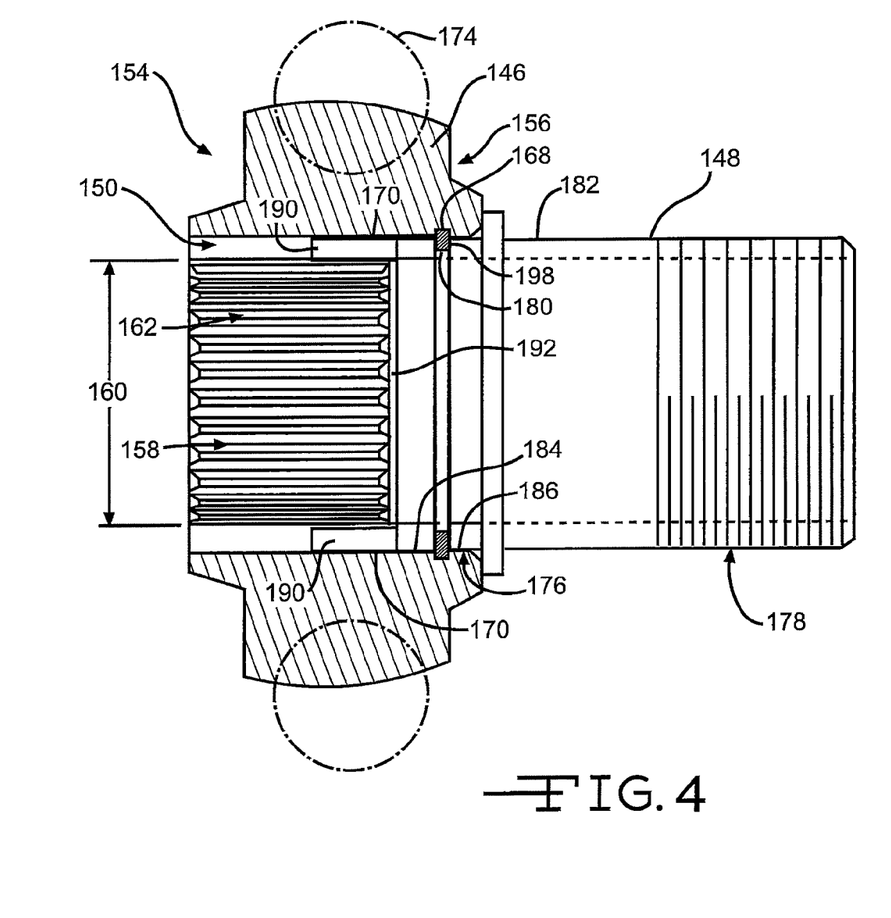
FIG. 4 is a cross-sectional assembly view of a boot sleeve and inner race according to another embodiment of the invention.

The inner surface 150 is defined by a plurality of surfaces. Beginning from the first end portion 154, a first inner surface 158 is provided. The first inner surface 158 has a first inner surface diameter 160. A set of splines 162 may be located on the first inner surface 158 and extend in the axial direction and may be circular in cross-section. The first inner surface 158 is directly adjacent and transitions to a second inner surface 164.

Figure 4A:
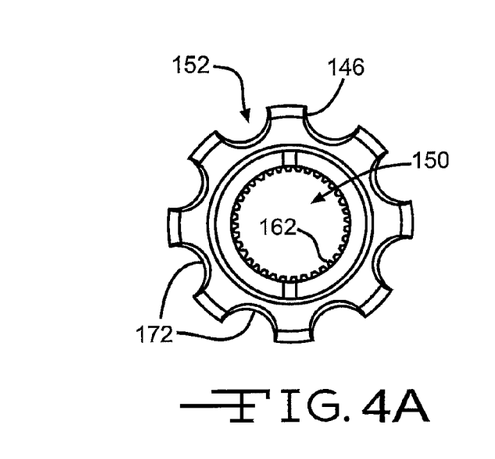
FIG. 4A is an end view of an inner race of FIG. 4.
Figure 4B:
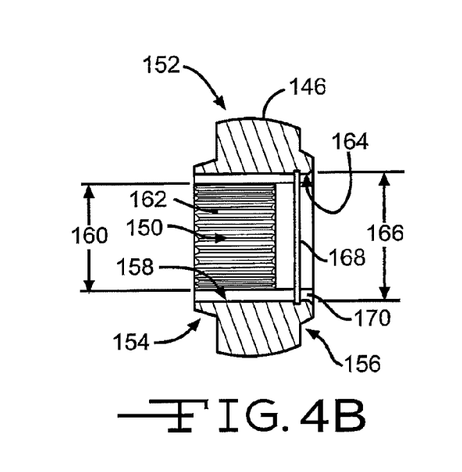
FIG. 4B is a cross-sectional view of the inner race of FIG. 4A.

The second inner surface 164 has a second inner surface diameter 166 and is circular as seen in FIG. 4A. The second inner surface diameter 166 is larger than the first inner surface diameter 160. The second inner surface 164 has a continuous, circumferential groove 168 defined therein. The groove 168 may be located approximately midway between the first inner surface 158 and the second end portion 156. The groove 168 follows the second inner surface 164. The groove 168 also therefore has a round shape.

The inner surface 150 has at least one slot 170. The at least one slot 170 extends axially along the first and second inner surfaces 158, 164 and perpendicular to the groove 168. The at least one slot 170 extends substantially the length of the inner race 146. The at least one slot 170 may have any cross section, such as square. The at least one slot 170 is integrally and unitarily formed with the inner race 146 and maybe located anywhere on the inner surface 150.

In the preferred embodiment, there are two slots 170. The slots 170 may be located at any circumferential distance with respect to one another. As can be appreciated from FIG. 4A, the slots 170 may be located equidistant from one another.

The outer surface 152 of the inner race 146 is defined by a plurality of grooves 174. Each groove 172 receives one ball. The balls 174 are maintained in a cage, as shown in the embodiment of FIG. 1. The balls 174 are also received within grooves in the inner surface of the outer race, which can also be appreciated from FIG. 1. The balls 172 permit angular differences between the inner race 146 and outer race, and transmit rotational torque from the inner race 146 to the outer race.

Figure 4C:
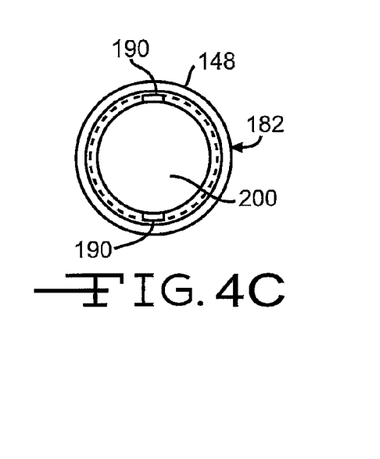
FIG. 4C is a perspective view of a boot sleeve from FIG. 4.
Figure 4D:
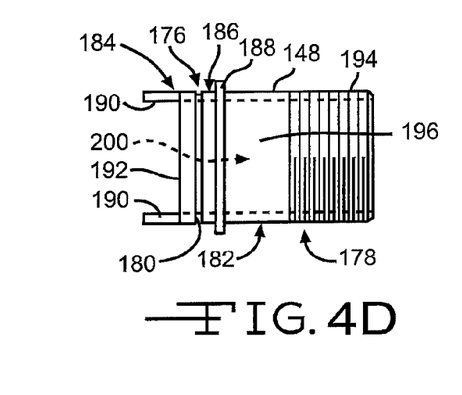
FIG. 4D is a side view of the boot sleeve of FIG. 4.

The boot sleeve 148 has first and second end portions 176, 178. The first end portion 176 comprises a continuous, circumferential groove 180 on an outer surface. More particularly, the first end portion 176 has a first land area 184, the groove 180, a second land area 186 and then a stop 188. The portions 176, 178, the groove 180 and the stop 188 may be integrally formed and unitary with the sleeve 148.

The first end portion 176 also has at least one prong 190 axially extending therefrom. More particularly, the at least one prong 190 extends from an end surface 192 of the first end portion 176 and is cantilevered therefrom. The at least one prong 190 is preferably integrally formed and unitary with the sleeve 148.

The at least one prong 190 preferably has a square cross-section, although other cross-sections are permissible. Regardless of its cross-section, the at least one prong 190 has a complimentary shape to the at least one slot 170.

In the preferred embodiment, there are two prongs 190. The two prongs 190 are identical to one another, but need not be; they may be of different shapes and sizes. The two prongs 190 are depicted as being approximately 180 degrees apart from one another, but it is permissible for other degree separations between the prongs 190 to exist.

The second end portion 178 comprises a plurality of threads 194 integrally formed and unitary with the sleeve 148. A nut may be engaged with the threads 194 of the second end portion 178 and also with the threads on a pinion shaft, or a retaining ring, to connect the nut and the pinion shaft together, as shown in the embodiment of FIG. 1. The pinion shaft is also therefore axially constrained to the inner race 146 through the nut. A land area 196 separates the second end portion 178 and the stop 188.

The first end portion 176 has a round shape that is complimentary to the round shape of the second inner surface 164 of the inner race 146.

A ring 198, such as a snap ring, is located in the boot sleeve groove 180 and the inner race groove 168. The ring 198 is sized to simultaneously extend into both the boot sleeve groove 180 and the groove 168 of the inner race 146. The ring 198 prevents, or reduces, axial movement between the inner race 146 and the boot sleeve 148.

When the prongs 190 are installed in the slots 170, the prong 190 and slot 170 combination prevents relative rotation between the inner race 146 and boot sleeve 148. More particularly, the walls of the slots 170 abut the prongs 190 and prevent relative rotation of the sleeve 148 and race 146.

A pinion shaft as shown in FIG. 1, may be located within a hollow interior portion 200 of the boot sleeve 148. The pinion shaft receives rotation from a source of rotational movement, such as a vehicle powertrain.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An inner race and boot sleeve combination, comprising:
    an inner race having a first inner surface with a first inner surface diameter and a second inner surface with a second inner surface diameter, said second inner surface diameter being greater than the first inner surface diameter and axially offset from said first inner surface diameter, said second inner surface having a circumferential inner race groove therein and a keyway partially extending only into said second inner surface;
    a boot sleeve having an outer surface, a first end portion with a circumferential groove and a second end portion;
    a key located on said boot sleeve outer surface, said key having a groove therein, said key located in said keyway;
    a ring in said inner race groove, said boot sleeve groove and said key groove.

2. The combination of claim 1, wherein said keyway has a round cross-section.

3. The combination of claim 2, wherein said keyway extends into a body portion of said inner race.

4. The combination of claim 2, wherein said key has a complementary shape to said keyway.

5. The combination of claim 1, wherein said inner race inner surface is located over the boot sleeve outer surface.

6. The combination of claim 1, wherein said keyway extends along the length of said second inner surface.

7. The combination of claim 1, wherein said key extends along the length of said keyway.

8. The combination of claim 1, wherein a portion of said keyway is located radially outward from said second inner surface.

9. The combination of claim 1, wherein said key has a cylindrical outer diameter.

10. The combination of claim 1, wherein said first inner surface has axially extending splines that terminate at said second inner surface.

\* \* \* \* \*